United States Patent
Tokura et al.

(10) Patent No.: US 10,967,863 B2
(45) Date of Patent: Apr. 6, 2021

(54) CONTROL DEVICE OF VEHICLE

(71) Applicant: TOYOTA JIDOSHA KABUSHIKI KAISHA, Toyota (JP)

(72) Inventors: Takaaki Tokura, Nagoya (JP); Hideki Takamatsu, Fujinomiya (JP); Hirofumi Sato, Mishima (JP); Shojiro Suga, Nissin (JP); Katsumi Kono, Toyota (JP); Akira Hino, Toyota (JP); Masato Matsubara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/695,390

(22) Filed: Nov. 26, 2019

(65) Prior Publication Data

US 2020/0164876 A1 May 28, 2020

(30) Foreign Application Priority Data

Nov. 27, 2018 (JP) .............................. JP2018-221103

(51) Int. Cl.
| | |
|---|---|
| *B60W 30/18* | (2012.01) |
| *B60W 10/06* | (2006.01) |
| *B60W 10/11* | (2012.01) |
| *B60W 50/00* | (2006.01) |
| *F16H 59/66* | (2006.01) |

(52) U.S. Cl.
CPC ............ *B60W 30/18* (2013.01); *B60W 10/06* (2013.01); *B60W 10/11* (2013.01); *B60W 50/0097* (2013.01); *B60W 2520/105* (2013.01); *B60W 2552/15* (2020.02); *B60W 2556/65* (2020.02); *B60W 2710/0666* (2013.01); *B60W 2710/10* (2013.01)

(58) Field of Classification Search
CPC ...... B60W 30/18; B60W 10/06; B60W 10/11; B60W 50/0097; B60W 2556/65; B60W 2552/15; B60W 2520/105; B60W 2710/0666; B60W 2710/10; F16H 2059/663; F16H 2059/666
See application file for complete search history.

(56) References Cited

U.S. PATENT DOCUMENTS

| 6,503,170 B1* | 1/2003 | Tabata ................ F16H 59/0204 |
| | | 475/254 |
| 2017/0008521 A1* | 1/2017 | Braunstein ............. G01C 21/32 |

(Continued)

FOREIGN PATENT DOCUMENTS

JP 2017-77765 A 4/2017

*Primary Examiner* — Tisha D Lewis
(74) *Attorney, Agent, or Firm* — Oliff PLC

(57) ABSTRACT

A control device of a vehicle with a stepped automatic transmission has: a gradient acquiring part; a driving force calculating part; a future change estimating part; and a shift control part. The shift control part prohibits change of the gear stage when the speed of change of the speed or acceleration of the vehicle in the future if the maximum driving force applied, is within a reference range of speed of change where the occupants would not notice a change in speed or acceleration, and permits change of the gear stage when the speed of change of the speed or acceleration of the vehicle in the future if the maximum driving force applied, is outside the reference range of speed of change.

2 Claims, 7 Drawing Sheets

(56) References Cited

U.S. PATENT DOCUMENTS

2017/0015321 A1* 1/2017 Nakadori ............... B60W 10/11
2019/0338849 A1* 11/2019 Chunodkar ........... B60W 10/06
2020/0096097 A1* 3/2020 Ooshima ............. F16H 61/0204

* cited by examiner

CONTROL DEVICE OF VEHICLE

FIELD

The present invention relates to a control device of a vehicle.

BACKGROUND

Known in the art is a control device of a vehicle detecting a gradient angle of a road on which a vehicle is driven, calculating a gradient angle which a vehicle can climb based on an output torque of an engine, a total gear ratio, and a carrying capacity of a vehicle, and notifying that the vehicle cannot be driven up a slope on a road if a climbable gradient angle is smaller than the gradient angle of the road being driven on (for example, PTL 1).

CITATION LIST

Patent Literature

[PTL 1] Japanese Unexamined Patent Publication No. 2017-77765

SUMMARY

Technical Problem

In this regard, in a stepped automatic transmission of a vehicle, a gear stage is set based on an operating state of a vehicle, such as an amount of depression of an accelerator pedal and a speed of the vehicle. Therefore, when the amount of depression of the accelerator pedal is constant, if the vehicle accelerates and the speed of the vehicle increases, the gear is automatically shifted up in the automatic transmission. On the other hand, if the vehicle is driven on an upward slope and the speed of the vehicle decreases, the gear is automatically shifted down in the automatic transmission.

For this reason, if a vehicle is driven over a bumpy road, the speed of the vehicle will frequently change. As a result, in the automatic transmission, the gear will be frequently shifted up and shifted down. If the gear is repeatedly frequently shifted up and shifted down in this way, the driveability will be deteriorated.

In view of the above problem, an object of the present disclosure is to keep the driveability from deteriorating due to the gear being repeatedly frequently shifted up and shifted down by a stepped automatic transmission.

Solution to Problem

The present invention was made so as to solve the above problem and has as its gist the following.

(1) A control device of a vehicle provided with a stepped automatic transmission, comprising:

a gradient acquiring part acquiring a gradient of a road on which the vehicle is scheduled to drive in the future, a driving force calculating part calculating a maximum driving force when a gear stage of the automatic transmission is a current gear stage, a future change estimating part estimating a change of speed or acceleration of the vehicle in the future if the maximum driving force is applied, based on the gradient of the road acquired by the gradient acquiring part and the maximum driving force calculated by the driving force calculating part, and a shift control part controlling a gear stage of the automatic transmission, wherein the shift control part prohibits change of the gear stage when the speed of change of the speed or acceleration of the vehicle in the future if the maximum driving force applied, estimated by the future change estimating part, is within a reference range of speed of change where the occupants would not notice a change in speed or acceleration, and permits change of the gear stage when the speed of change of the speed or acceleration of the vehicle in the future if the maximum driving force applied, estimated by the future change estimating part, is outside the reference range of speed of change.

(2) The control device of a vehicle according to claim 1, further comprising:

an output torque control part controlling an output torque of an internal combustion engine, wherein the driving force calculating part calculates a current driving force when the gear stage of the automatic transmission is the current gear stage and the output torque of the internal combustion engine is the current output torque, the future change estimating part estimates a change of speed or acceleration of the vehicle in the future when it is assumed the current driving force continues, based on the gradient of the road acquired by the gradient acquiring part and the current driving force calculated by the driving force calculating part, and the output torque control part controls the output torque so that when the speed of change of the speed or acceleration of the vehicle in the future when assuming the current driving force continues, estimated by the future change estimating part, is outside a minimum range of speed of change narrower than the reference range of speed of change, the speed of change is within the minimum range of speed of change.

(3) The control device of a vehicle according to claim 1, further comprising:

a communication device able to communicate with a vehicle other than the vehicle, wherein the gradient acquiring part acquires the gradient of the road on which the vehicle is scheduled to be driven in the future from another vehicle driving in front of the vehicle through the communication device.

Advantageous Effects of Invention

According to the present disclosure, the drivability is kept from deteriorating due to the gear being repeatedly frequently shifted up and shifted down by a stepped automatic transmission.

DESCRIPTION OF EMBODIMENTS

Figure 1:
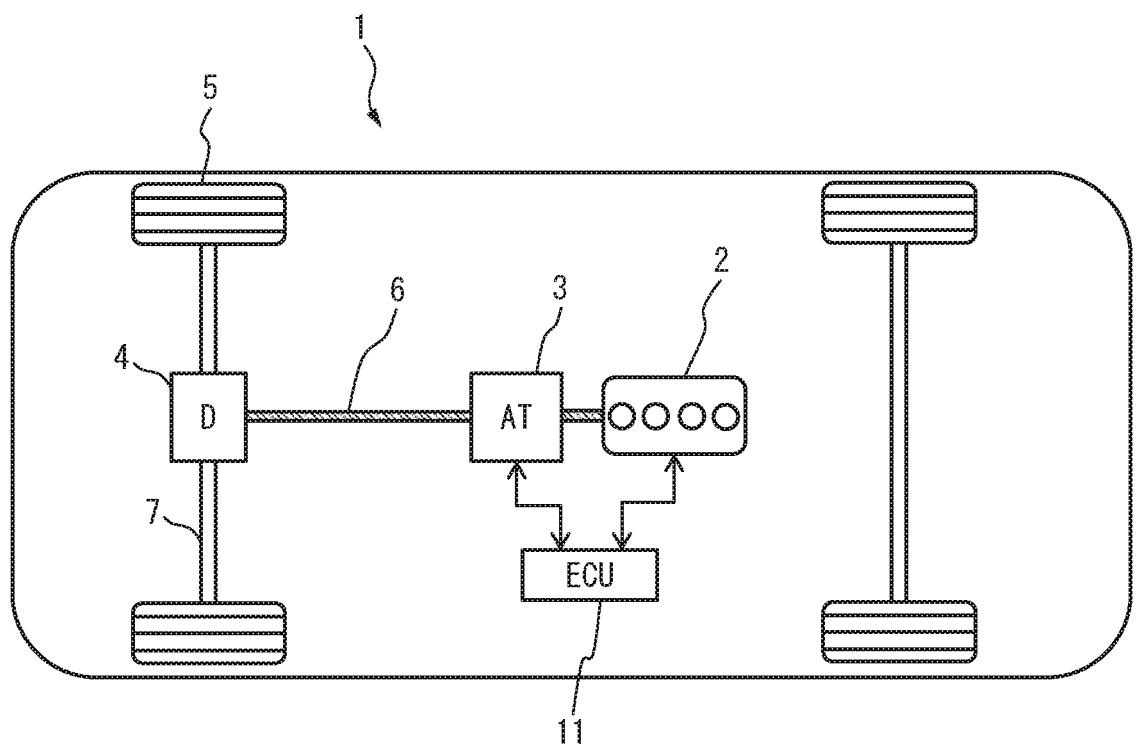
FIG. 1 is a view schematically showing the configuration of a vehicle mounting a control device according to a first embodiment.

Below, referring to the drawings, embodiments of the present invention will be explained in detail. Note that, in the following description, similar constituent elements are assigned the same reference signs.

First Embodiment

Configuration of Vehicle

First, referring to FIG. 1, the configuration of the vehicle 1 will be explained. FIG. 1 is a view schematically showing the configuration of a vehicle 1 mounting a control device according to a first embodiment. As shown in FIG. 1, the vehicle 1 is provided with an internal combustion engine 2, stepped automatic transmission 3, differential gear 4, and wheels 5.

The internal combustion engine 2 is a prime mover burning fuel such as gasoline or diesel fuel inside the engine to convert heat energy of combustion gas to mechanical energy. The output of the internal combustion engine 2 is controlled by adjusting the amount of fuel and air supplied to the internal combustion engine 2.

The automatic transmission 3 is a power transmission system transmitting power output from the internal combustion engine 2 while changing torque or speed. The automatic transmission 3 is connected through a flywheel, etc., to a crankshaft (not shown) of the internal combustion engine 2. Power is input from the internal combustion engine 2 to the automatic transmission 3. On the other hand, the automatic transmission 3 is connected through a propeller shaft 6 to a differential gear 4 and output the power to the differential gear 4.

The automatic transmission 3 can transmit power output from the internal combustion engine 2 by a plurality of different gear ratios. In this regard, the "gear ratio" means the ratio of a rotational speed at an input side with respect to a rotational speed of an output side. In the automatic transmission 3, the gear ratio is automatically switched in accordance with the operating state of the internal combustion engine.

In the present embodiment, the automatic transmission 3 has four gear stages. Therefore, it can transmit power by four different gear ratios. At the gear stages of the first speed gear to fourth speed gear, the gear ratio is highest at the first speed gear and the gear ratio is lowest at the fourth speed gear. Note that, while the automatic transmission 3 has four gear stages in the present embodiment, the number of stages may be any number, so long as the automatic transmission 3 has gear stages.

The differential gear 4 is used for absorbing the difference in rotational speeds of the left and right wheels 5 while equally distributing the power transmitted from the automatic transmission 3 to the left and right wheels 5. The differential gear 4 transmits the power to the left and right wheels 5 through the drive shaft 7.

Control Device

Figure 2:
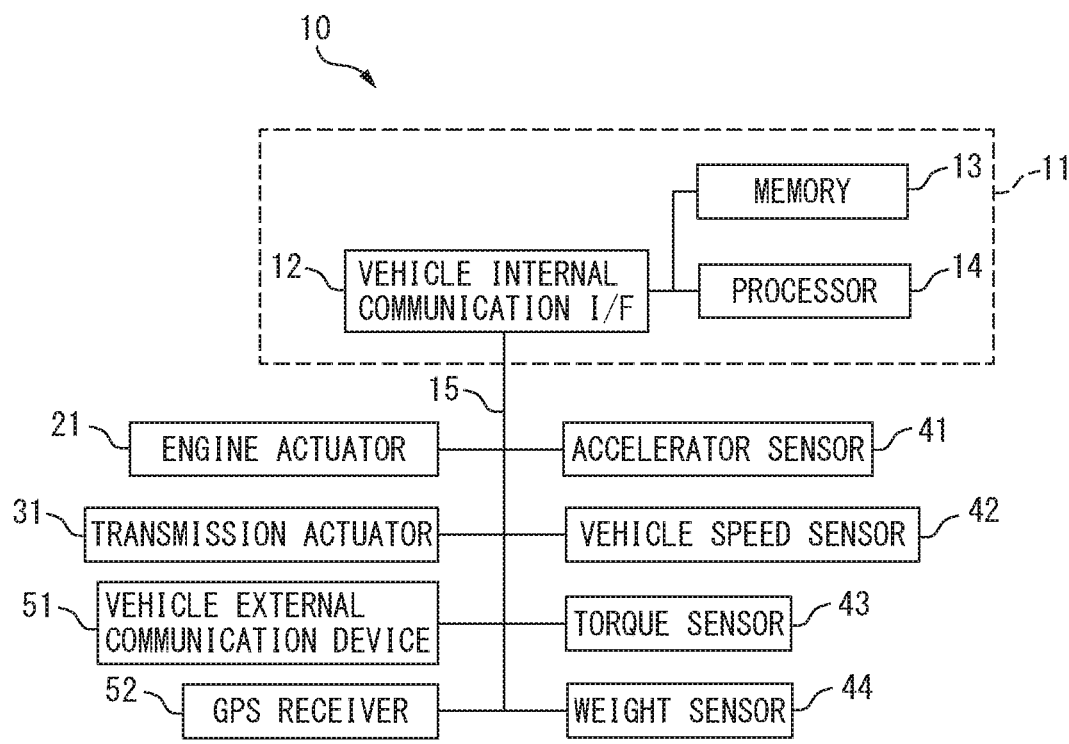
FIG. 2 is a view of the configuration schematically showing the control device.

Next, referring to FIG. 2, the configuration of the control device 10 of the vehicle 1 will be explained. FIG. 2 is a view of the configuration schematically showing the control device 10. As shown in FIG. 2, the control device 10 is provided with an ECU 11. The ECU 11 controls the internal combustion engine 2 and the automatic transmission 3.

The ECU 11 has a vehicle internal communication interface 12, memory 13, and processor 14. The vehicle internal communication interface 12 and memory 13 are connected through signal wires to the processor 14.

The vehicle internal communication interface 12 has an interface circuit for connecting the ECU 3 to a vehicle internal network 15 based on the CAN (Controller Area Network) or other standard. That is, the vehicle internal communication interface 12 is connected through the vehicle internal network 15 to various actuators or various sensors, which are explained later. Further, the vehicle internal communication interface 12 receives the output data from the various sensors and transmits the received output data to the processor 14. Further, the vehicle internal communication interface 12 inputs the output signals transmitted from the processor 14 to the various actuators.

The memory 13, for example, has a volatile semiconductor memory and nonvolatile semiconductor memory. The memory 13 stores various data, etc., used when various processing is performed by the processor 14. For example, the memory 13 stores output data received from the various sensors, and map information, etc. Further, the memory 13 stores a computer program for enabling the processor 14 to perform the various processing.

The processor 14 has one or more CPU (central processing units) and their peripheral circuits. The processor 14 may further have a GPU (graphics processing unit). The processor 14 performs the later explained shift judging processing at every certain time interval and controls the actuators of the automatic transmission 3 based on the results of shift judging processing, while the ignition switch of the vehicle 1 is on.

In the present embodiment, the control device 10 is further provided with engine actuators 21, a transmission actuator 31, accelerator sensor 41, vehicle speed sensor 42, torque sensor 43, weight sensor 44, vehicle external communication device 51, and GPS receiver 52. These actuators, sensors, vehicle external communication device 51, and GPS receiver 52 are connected through the vehicle internal network 15 to the vehicle internal communication interface 12 of the ECU 11.

The engine actuators 21 are various actuators for controlling the internal combustion engine 2. The engine actuators 21 include, for example, a fuel feed system feeding fuel to combustion chambers of the internal combustion engine 2, an opening degree control device controlling an opening degree of a throttle valve provided in an engine intake passage, and spark plugs igniting an air-fuel mixture in the combustion chambers of the internal combustion engine 2. Therefore, the engine actuators 21 can adjust the output torque of the internal combustion engine 2.

The transmission actuator 31 includes a solenoid driving a brake mechanism or clutch mechanism, which control rotation of a ring gear, pinion gear, and sun gear provided in the automatic transmission 3. Therefore, the transmission actuator 31 can change the gear stage of the automatic transmission 3.

The accelerator sensor 41 is attached to the accelerator pedal and detects the amount of depression of the accelerator pedal. The vehicle speed sensor 42 is attached, for example, to the wheels 5 or the drive shaft 7, and detects the speed of the vehicle 1. The torque sensor 43, for example, is attached to the output shaft of the internal combustion engine 2 or the automatic transmission 3 (crankshaft or propeller shaft), and detects the output torque of the internal combustion engine 2 or the automatic transmission 3. The weight sensor 44 is attached, for example, to the suspension of the vehicle 1, and detects the weight of the vehicle 1. The outputs of these sensors are input to the ECU 11 through the vehicle internal network 15.

The vehicle external communication device 51 is a device able to communicate wirelessly with an external server or with another vehicle. The standard used in the wireless communication includes the Long Term Evolution (LTE) formulated by the 3GPP, the wireless LAN (IEEE 802.11a/b/g/n/ac), Mobile WiMAX (IEEE 802.16e), iBurst or WAVE (IEEE 802.20), DSRC (Dedicated Short Range Communication), or various other communication standards. The vehicle external communication device 51 sends and receives signals to and from the ECU 11 through the vehicle internal network 15.

The GPS receiver 52 is a device for receiving signals from three or more GPS satellites and detecting the current position of the vehicle 1 (for example, the latitude and longitude of the vehicle 1). The GPS receiver 52 sends the detected current position information of the vehicle 1 to the ECU 11.

Processing at ECU

Figure 3:
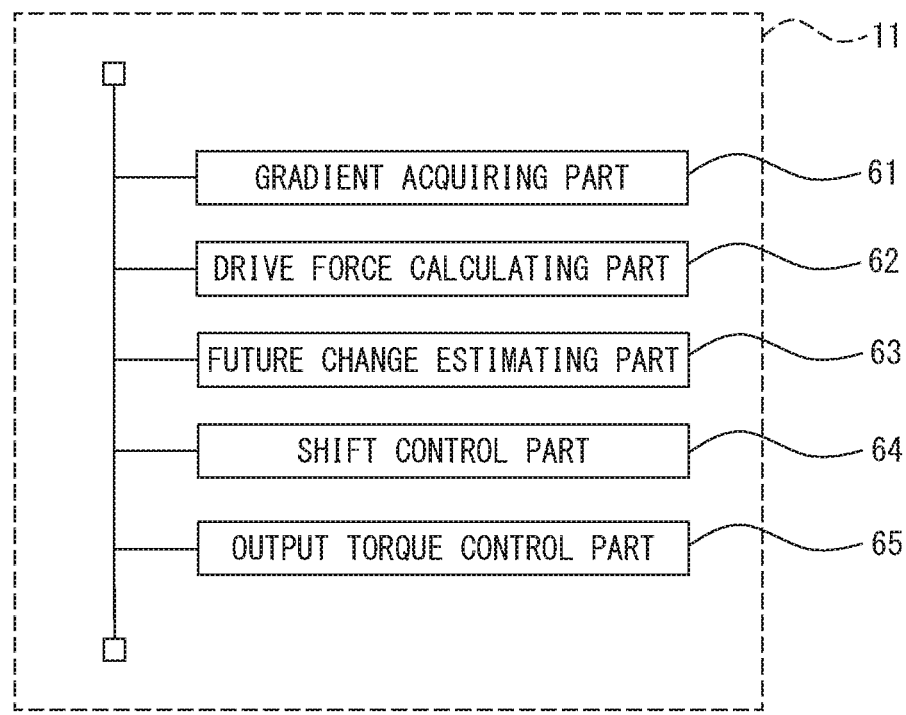
FIG. 3 is a functional block diagram of an ECU relating to processing for control of the vehicle.

FIG. 3 is a functional block diagram of an ECU 3 relating to processing for control of the vehicle. The ECU 3 has a gradient acquiring part 61, driving force calculating part 62, future change estimating part 63, shift control part 64, and output torque control part 65. These functional blocks of the ECU 3 are, for example, functional modules realized by a computer program operating on the processor 14. Note that, these functional blocks may also be dedicated processing circuits provided at the processor 14.

The gradient acquiring part 61 acquires the gradient of a road on which the vehicle 1 is scheduled to be driven in the future. In particular, the gradient acquiring part 61 acquires the gradient of the road scheduled to be driven on within the nearest predetermined time in the road of the driving route on which the vehicle 1 is scheduled to be driven in the future.

The gradient acquiring part 61 acquires the gradient of the road, for example, based on the current position information of the vehicle 1 transmitted from the GPS receiver 52 and the map information stored in the memory 13. In this case, the map information includes the gradient information of roads. The gradient acquiring part 61 identifies the road on which the vehicle is scheduled to be driven in the future (for example, the road on which it is scheduled to be driven within the next 10 seconds or the road within 1 km from the current position scheduled to be driven on in the future), based on the current position information transmitted from the GPS receiver 52 and the preset driving route. Then, the gradient acquiring part 61 acquires the gradient of the road on which the vehicle is scheduled to be driven in the future, from the map information stored in the memory 13.

In this case, the ECU 3 may be configured to update the map information stored in the memory 13 through the vehicle external communication device 51 at any timing. Specifically, if the map information of the external server (not shown) is updated, the updated map information is sent from the server to the vehicle external communication device 51, and the map information stored in the memory 13 is updated to the sent map information.

The map information of the external server may be automatically updated by the gradient information sent from a vehicle being driven over a covered road. In this case, the vehicle driving over the covered road for example, calculates the gradient θ of the road using the following equation (1):

$$\theta = \arcsin[(Fd - M \cdot a - F(A \cdot v^2 + B \cdot v + C))/M \cdot g] \quad (1)$$

In the equation (1), Fd indicates the driving force output by the vehicle, M indicates the total weight of the vehicle, "a" is the acceleration of the vehicle, F is the driving resistance when assuming the gradient is 0, "v" is the speed of the vehicle, and "g" is the acceleration of gravity. Further, A, B, and C are constants calculated by computation or experiments.

The driving force Fd is calculated, for example, based on the amount of depression of the accelerator pedal, the gear stage of the automatic transmission 3, etc. The total weight M of the vehicle is calculated, for example, based on the weight sensor 44, etc., provided at the suspension of the vehicle. The acceleration "a" of the vehicle is, for example, calculated based on the output of the vehicle speed sensor 42. In addition, the driving resistance F is calculated in advance by experiments or by computation for each car model.

The vehicle being driven on the covered road calculates, by the ECU 3, the gradient of the road, using the above equation (1), based on the driving force Fd, the total weight M of the vehicle, the acceleration "a" of the vehicle, and the driving resistance F. Then, the vehicle sends the gradient information of the road being driven on, to the server together with the position information. The server updates the map information based on the gradient information and the position information sent from vehicles being driven through various positions in this way.

Note that, in the present embodiment, the gradient information of roads calculated by vehicles is sent to the server, map information updated based on this gradient information is sent to the vehicles, and, at the vehicles, the gradient of the road on which the vehicle is scheduled to be driven in the future is acquired based on the map information. However, the vehicles may also be configured to directly receive gradient information on the road on which the vehicle 1 is to be driven in the future, together with position information, from other vehicles in the surroundings being driven in front of the vehicle 1. In this case, the gradient acquiring part 61 acquires the gradient of the road on which the vehicle is scheduled to be driven in the future, based on the gradient information and the position information received from other vehicles, in addition to the road on which the vehicle 1 is scheduled to be driven in the future and the map information stored in memory 13.

The driving force calculating part 62 calculates the driving force of the vehicle 1 when the gear stage of the automatic transmission 3 is the current gear stage. The driving force calculating part 62 estimates, in particular, a maximum driving force when the gear stage of the automatic transmission 3 is the current gear stage. In addition, the driving force calculating part 62 calculates the current driving force when the gear stage of the automatic transmission is the current gear stage and the output torque of the internal combustion engine 2 is the current output torque.

The driving force of the vehicle 1 when the amount of depression of the accelerator pedal is maximum (that is, when the output of the internal combustion engine 2 is maximum) changes in accordance with the gear stage of the automatic transmission 3 and the speed of the vehicle 1. The maximum driving force means the largest driving force able to be output by the vehicle 1 when changing the speed of the vehicle 1 at the gear stage of the automatic transmission 3. The relationship between the gear stages and the maximum driving force is calculated in advance by experiments or by computation and stored in the memory 13. The driving force calculating part 62 calculates the maximum driving force, based on the current gear stage of the automatic transmission 3, using the relationship stored in the memory 13.

On the other hand, the driving force of the vehicle 1 changes depending also on the amount of depression of the accelerator pedal, in addition to the gear stage of the automatic transmission 3 and the speed of the vehicle 1. In the present embodiment, the relationship between the gear stages and the driving force and the amount of depression of the accelerator pedal is calculated in advance by experiments or by computation and stored in the memory 13. The driving force calculating part 62 calculates the drive force (current driving force) at the time of the current amount of depression of the accelerator pedal, using the relationship stored in the memory 13, based on the amount of depression of the accelerator pedal output by the accelerator sensor 41 and the current gear stage of the automatic transmission 3.

The future change estimating part 63 estimates the change of the acceleration "a" of the vehicle 1 in the future when the maximum driving force continues, based on the gradient of the road acquired by the gradient acquiring part 61 and the maximum driving force calculated by the driving force calculating part 62. The acceleration "a" of the vehicle 1 at the time "t" is, for example, calculated by the following equation (2):

$$a=[Fdm-F(A \cdot v^2+B \cdot v+C)-M \cdot g \cdot \sin\theta]/M \quad (2)$$

Here, Fdm indicates the maximum driving force output by the vehicle 1. The value calculated by the driving force calculating part 62 is assigned to Fdm. Further, $\theta$ indicates the gradient of the road. The value acquired by the gradient acquiring part 61 is assigned to $\theta$.

In particular, in the present embodiment, the current acceleration "a" is calculated by the above equation (2), based on the current speed of the vehicle 1 detected by the vehicle speed sensor 42. Further, the speed of the vehicle 1 after the fine time $\Delta t$ seconds is calculated based on the current acceleration "a" calculated in this way, and the road (position) on which the vehicle 1 will be driven after the fine time $\Delta t$ seconds is calculated based on the current speed. After that, the gradient of the road on which the vehicle 1 will be driven after $\Delta t$ seconds is calculated from the gradient of the road acquired by the gradient acquiring part 61, and the acceleration "a" after $\Delta t$ seconds is calculated based on the calculated gradient of the road and the speed after $\Delta t$ seconds. By repeating this operation, the change in the acceleration of the vehicle 1 from the current time to a predetermined time later (for example, 10 seconds) is estimated.

In addition, in the present embodiment, the future change estimating part 63 estimates the speed of change of the acceleration, that is, the "jerk". Specifically, the jerk at the time "t" is calculated as the difference between the acceleration a(t) at the time "t" and the acceleration a(t+1) at the time t+1.

The shift control part 64 controls the gear stage of the automatic transmission 3. In the present embodiment, the shift control part 64 basically sets the gear stage, based on the current speed of the vehicle 1 detected by the vehicle speed sensor 42 and the amount of depression of the accelerator pedal (accelerator opening degree) detected by the accelerator sensor 41.

Figure 4:
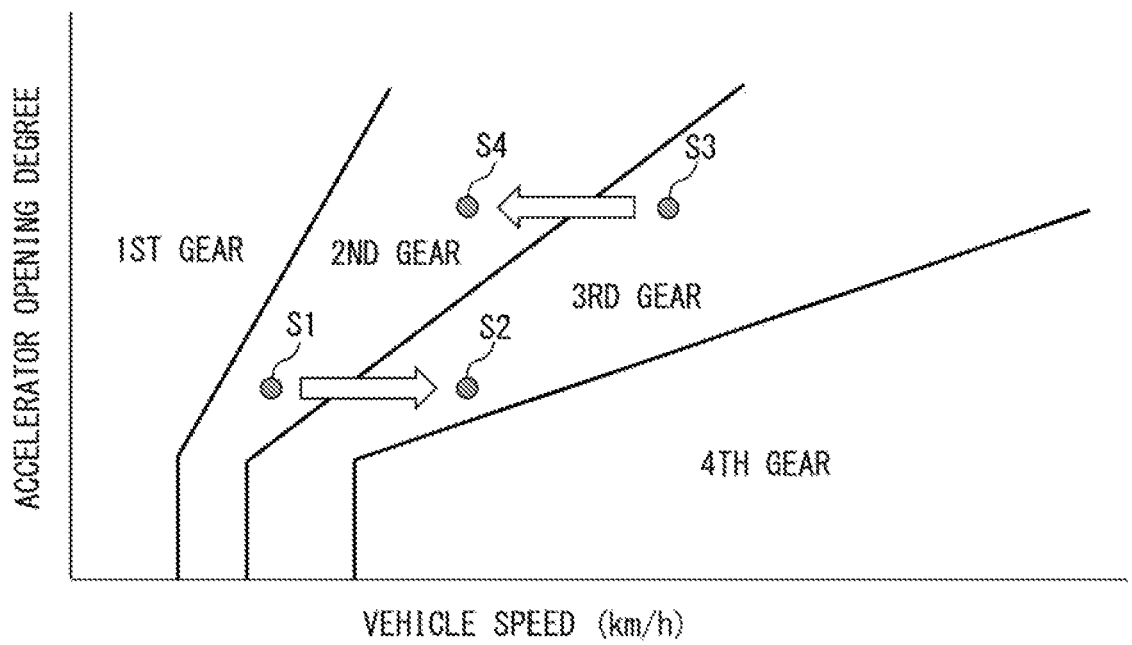
FIG. 4 is a view showing a relationship between a speed of the vehicle (vehicle speed) and an amount of depression of an accelerator pedal (accelerator opening degree), and a gear stage.

FIG. 4 is a view showing a relationship between the speed of the vehicle 1 (vehicle speed) and the amount of depression of the accelerator pedal (accelerator opening degree) and gear stage. As shown in FIG. 4, the gear stage is set to a higher stage as the speed of the vehicle 1 increases. Further, the gear stage is set to a lower stage as the amount of depression of the accelerator pedal increases.

For example, consider the case where the speed of the vehicle 1 and the amount of depression of the accelerator pedal change from the values shown at s1 in FIG. 4 to the values shown at s2 in FIG. 4 with the amount of depression of the accelerator pedal maintained constant as is and the speed becoming faster. Here, s1 is within the region where the gear stage is set to the 2nd speed gear and s2 is within the region where the gear stage is set to the 3rd speed gear. Therefore, in this case, the gear stage of the automatic transmission 3 is shifted from 2nd speed gear to 3rd speed gear.

On the other hand, consider the case where the speed of the vehicle 1 and the amount of depression of the accelerator pedal change from the values shown at s3 in FIG. 4 to the values shown at s4 in FIG. 4 with the amount of depression of the accelerator pedal maintained constant as is and the speed becoming slower. Here, s3 is within the region where the gear stage is set to 3rd speed gear and s4 is within the region where the gear stage is set to 2nd speed gear, therefore in this case, the gear stage of the automatic transmission 3 is shifted from 2nd speed gear to 3rd speed gear.

The output torque control part 65 controls the output torque of the internal combustion engine 2. The output torque control part 65 basically controls the output torque, based on the amount of depression of the accelerator pedal detected by the accelerator sensor 41. The output torque control part 65 basically controls the output torque so that the output torque of the internal combustion engine 2 is maintained constant when the gear stage of the automatic transmission 3 is the same and the amount of depression is being maintained constant. On the other hand, the output torque control part 65 controls the output torque so that the output torque of the internal combustion engine 2 becomes larger when the amount of depression changes to become larger, while conversely so that the output torque of the internal combustion engine 2 becomes smaller when the amount of depression changes to become smaller.

Frequency of Changing Gear Stage

In this regard, if the vehicle 1 is being driven on a road with a changing gradient, the speed of the vehicle 1 will change according to the change of the gradient. Along with this, the gear stage will frequently change in some cases. This will be explained referring to FIG. 5.

Figure 5:
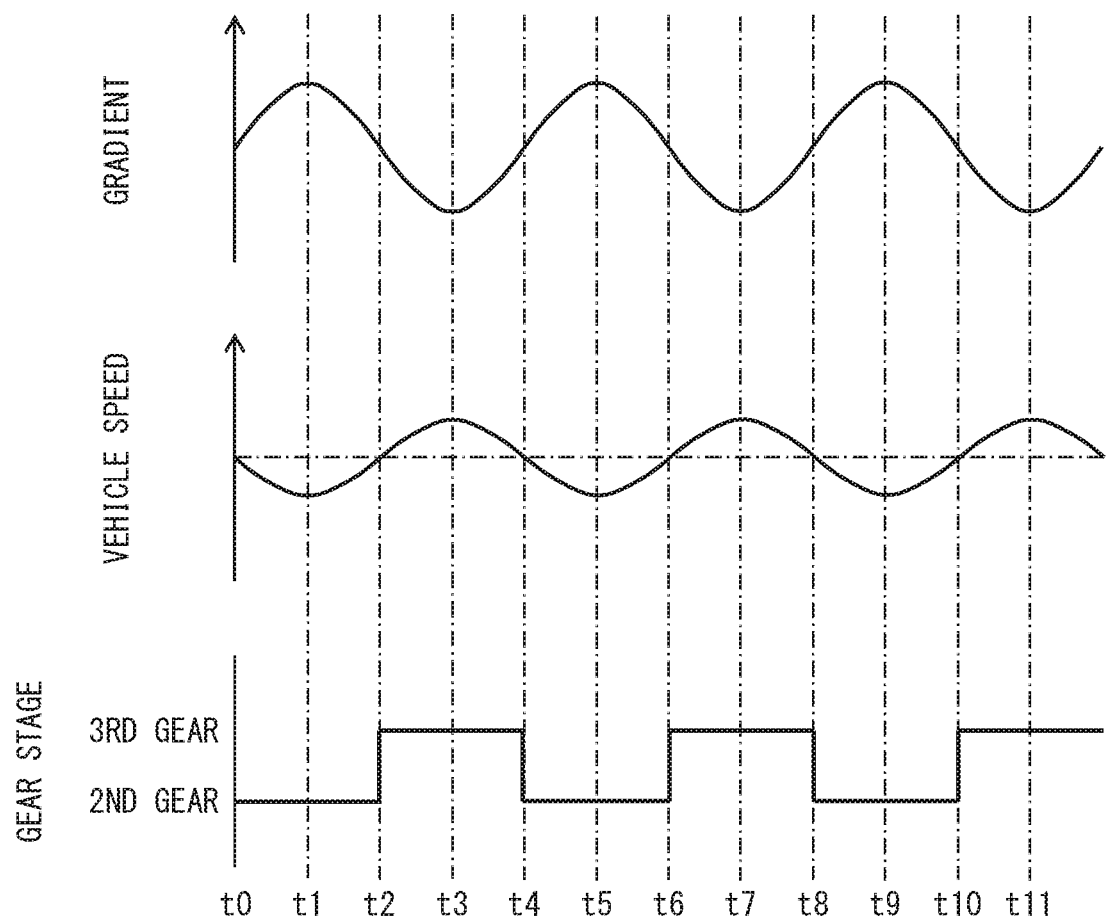
FIG. 5 is a time chart showing trends in the vehicle speed and gear stage when a vehicle is being driven over a road with a changing gradient.

FIG. 5 is a time chart showing trends in the vehicle speed and gear stage, when the vehicle 1 is being driven on a road with a changing gradient. The example shown in FIG. 5 shows the case where the amount of depression of the accelerator pedal for example remains a constant full open.

As shown in FIG. 5, between the timings t0 to t2, the vehicle 1 is driven over a road with a large gradient. For this reason, the speed of the vehicle 1 is slow and accordingly the gear stage is set to a low gear stage of 2nd speed gear, based on the map shown in FIG. 4. After that, between the timings t2 to t4, the vehicle 1 is driven on a road with a small gradient (including downward gradient). For this reason, the speed of the vehicle 1 is fast and accordingly the gear stage is set to a high gear stage of 3rd speed gear, based on the map shown in FIG. 4.

After that, between the timings t4 to t6, the vehicle 1 is driven on a road with a large gradient and, between the timings t6 to t8, is driven on a road with a small gradient. As a result, the gear stage of the automatic transmission 3 is set to 2nd speed gear between the timings t4 to t6, and to 3rd speed gear between the timings t6 to t8. If alternately driving on a road with a large gradient and a road with a small gradient in this way, in the automatic transmission 3, the gear is repeatedly frequently shifted up and shifted down. As a result, the drivability is deteriorated.

On the other hand, if restricting shifting of the automatic transmission 3 in order to suppress frequent shifting of the gear up and shifting of the gear down in the automatic transmission 3, the speed or acceleration of the vehicle 1 changes so much as to make the occupants of the vehicle 1 feel uncomfortable. As a result, the comfort of the occupants is lost.

Control of Gear Level

Therefore, in the present embodiment, the shift control part 64 is configured so as to prohibit change of the gear stage, when the speed of change of the acceleration of the vehicle in the future if the maximum driving force is applied, estimated by the future change estimating part 63, is within the reference range of speed of change where the occupants will not notice the change of acceleration. In addition, the shift control part 64 is configured so as to permit the change of the gear stage, when the speed of change of acceleration of the vehicle in the future if the maximum driving force is applied, estimated by the future change estimating part 63, is outside the reference range of speed of change.

Here, according to research of the inventors of the present application, it was discovered that occupants of the vehicle 1 feel that acceleration is constant, not when the acceleration of the vehicle 1 is constant, but when the acceleration of the vehicle 1 changes in accordance with certain set rules. Furthermore, the inventors of the present application discovered that when the acceleration of the vehicle 1 is in the relationship shown by the following equation (3), the occupants of the vehicle 1 feel that the vehicle 1 is accelerating (or decelerating) by constants acceleration.

$$a(t) = \alpha \cdot \exp(-\beta \cdot v(t)) \quad (3)$$

In equation (3), a(t) is the acceleration of the vehicle 1 at the time "t", while v(t) is the speed of the vehicle 1 at the time "t". Further, α and β are constants.

Here, assigning a(t)=dv(t)/dt and simplifying the equation, equation (3) is expressed as the following equation (4). In the case of integrating the both sides of the following equation (4) and simplifying equation, equation (4) is expressed as the following equation (5):

[Formula 1]

$$\frac{\exp(\beta \cdot v(t))}{\alpha} dv = dt \quad (4)$$

$$v(t) = \frac{1}{\beta} \log_e [\alpha \cdot \beta \cdot (t + t_0)] \quad (5)$$

Here, assuming the speed v(t) of the vehicle 1 is zero at the timing "t"=0, the result becomes $\alpha \cdot \beta \cdot t_0 = 1$, therefore equation (5) is expressed as the following equation (6). Further, by differentiating both sides of equation (6), equation (7) is derived. In the case of further differentiating both sides of equation (7), equation (8) is derived. Note that, in equation (8), J(t) indicates jerking. Further, equation (9) is derived from equation (7) and equation (8).

[Formula 2]

$$v(t) = \frac{1}{\beta} \log_e [\alpha \cdot \beta \cdot t + 1] \quad (6)$$

$$a(t) = \frac{\alpha}{\alpha \cdot \beta \cdot t + 1} \quad (7)$$

$$J(t) = \frac{\alpha^2 \cdot \beta}{(\alpha \cdot \beta \cdot t + 1)^2} \quad (8)$$

$$J(t) = -\beta \cdot a(t)^2 \quad (9)$$

As explained above, equation (3) shows the relationship between the speed and acceleration at which occupants of the vehicle 1 feel a vehicle is accelerating (or decelerating) by a constant acceleration, therefore equation (9) shows the relationship between the acceleration and jerk at which occupants of the vehicle 1 feel a vehicle is accelerating (or decelerating) by a constant acceleration. Therefore, when the current acceleration is a(t), if the acceleration changes by the speed of change of acceleration (jerk) shown by equation (9), the occupants of the vehicle 1 will feel the acceleration is not changing.

Further, the inventors of the present application discovered that when the jerk of the vehicle 1 is within a certain range centered about the jerk J(t) calculated by the above equation (9) (below, referred to as the "reference range of speed of change"), the occupants of the vehicle 1 will not notice a change of acceleration. Specifically, the reference range of speed of change is, for example, shown by the following equation (10):

$$-\beta \cdot a(t)^2 - P \leq J(t) \leq -\beta \cdot a(t)^2 + P \quad (10)$$

In equation (10), P is a positive constant and is found by experiments. There are individual differences in the range where the occupants will not notice a change in acceleration of the vehicle 1, therefore P is set to a value at which most occupants will not notice the change.

Here, as explained above, the future change estimating part 63 estimates the change of the acceleration "a" of the vehicle 1 in the future if the maximum driving force is applied. Therefore, the future change estimating part 63 estimates the trend in the acceleration "a" of the vehicle 1 from the current time to a predetermined time later (for example, 10 seconds later), and estimates the trend in the jerk J from the trend in the acceleration "a".

The shift control part 64 judges if the jerk J at different points of time from the current time to a predetermined time later, estimated by the future change estimating part 63, is within the reference range of speed of change shown by the above equation (10). Further, in the shift control part 64, the gear stage is maintained when the jerk J at the different points of time is within the reference range of speed of change, even when the gear should be shifted in the automatic transmission 3 if referring to the map shown in FIG. 4, since the occupants will not notice the change of acceleration.

On the other hand, the shift control part 64 permits the change of the gear stage when the jerk J at the different points of time is outside the reference range of speed of change, since unless shifting, the acceleration will change to an extent which the occupants notice. Therefore, when sometimes the jerk J will become a value outside the reference range of speed of change in the period from the current time to a predetermined time later, the gear will be shifted in accordance with the map shown in FIG. 4. As a result, the gear stage is shifted to a suitable gear stage, therefore the change of acceleration of the vehicle 1 is kept within the reference range of speed of change. Therefore, when the jerk J at the different points of time is outside the reference range of speed of change, the shift control part 64 changes the gear stage so that the speed of change of the acceleration of the vehicle in the future is within the reference range of speed of change.

Figure 6:
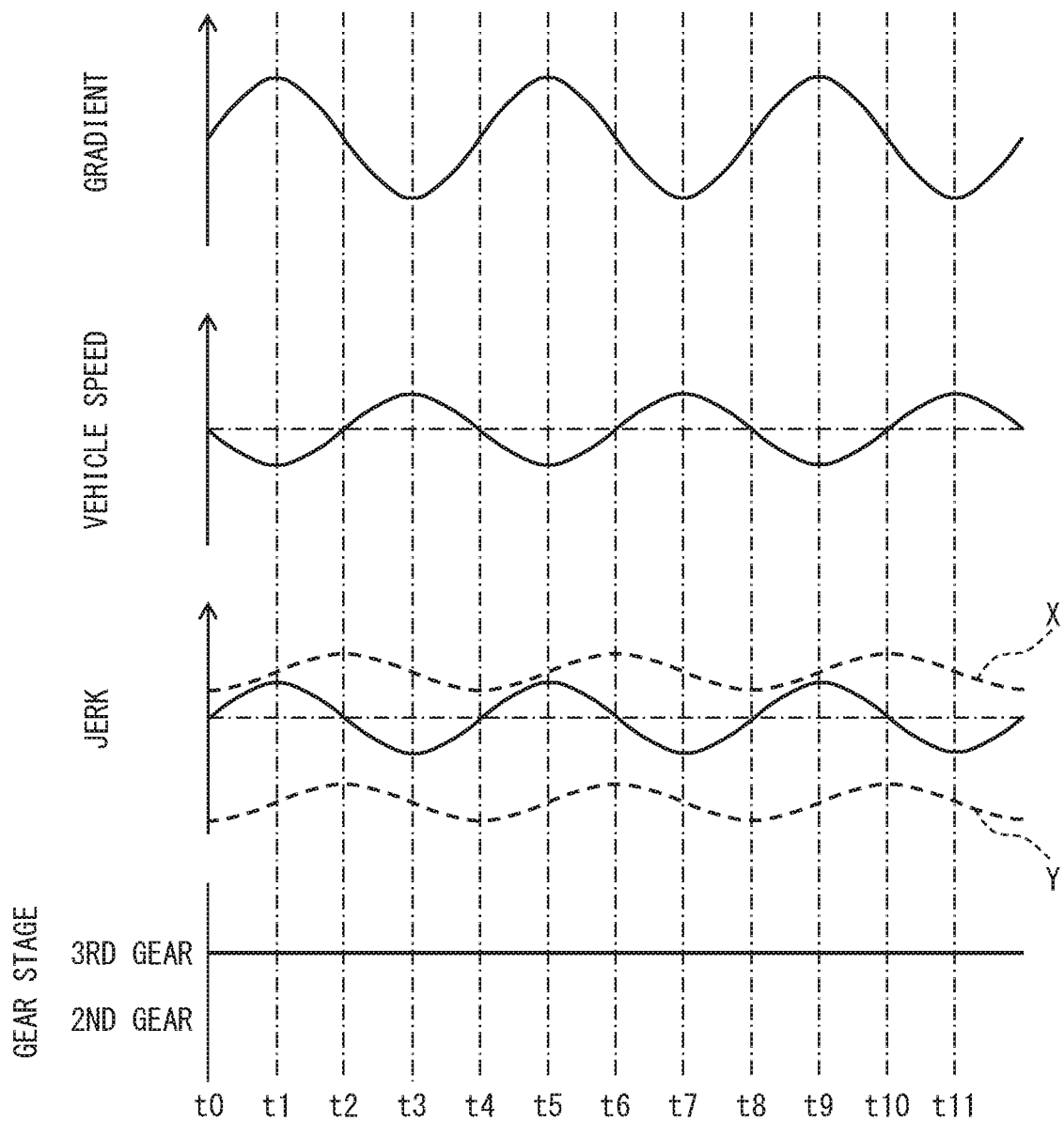
FIG. 6 is a time chart showing trends in the vehicle speed, jerk, and gear stage when a vehicle is being driven over a road with a changing gradient.

FIG. 6 is a time chart showing trends in the vehicle speed, jerk, and gear stage when the vehicle 1 is being driven over a road with a changing gradient. In particular, FIG. 6 shows the trends in the case where the vehicle 1 is being driven over a road having a change of gradient similar to the example shown in FIG. 5.

The broken line X at the top in the jerk of FIG. 6 indicates $-\beta \cdot a(t)^2 + P$. The broken line Y of the bottom indicates $-\beta \cdot a(t)^2 - P$. Therefore, the region surrounded by the top and bottom broken lines indicates the reference range of speed of change. In the example shown in FIG. 6, the jerk is expected to be maintained in the reference range of speed of change over the time period from the timing t0 to the timing t11. As a result, in the example shown in FIG. 6, despite the speed of the vehicle 1 changing in the same way as the example shown in FIG. 5, the gear stage of the automatic transmission 3 is maintained at 3rd speed gear.

Specific Control

Figure 7:
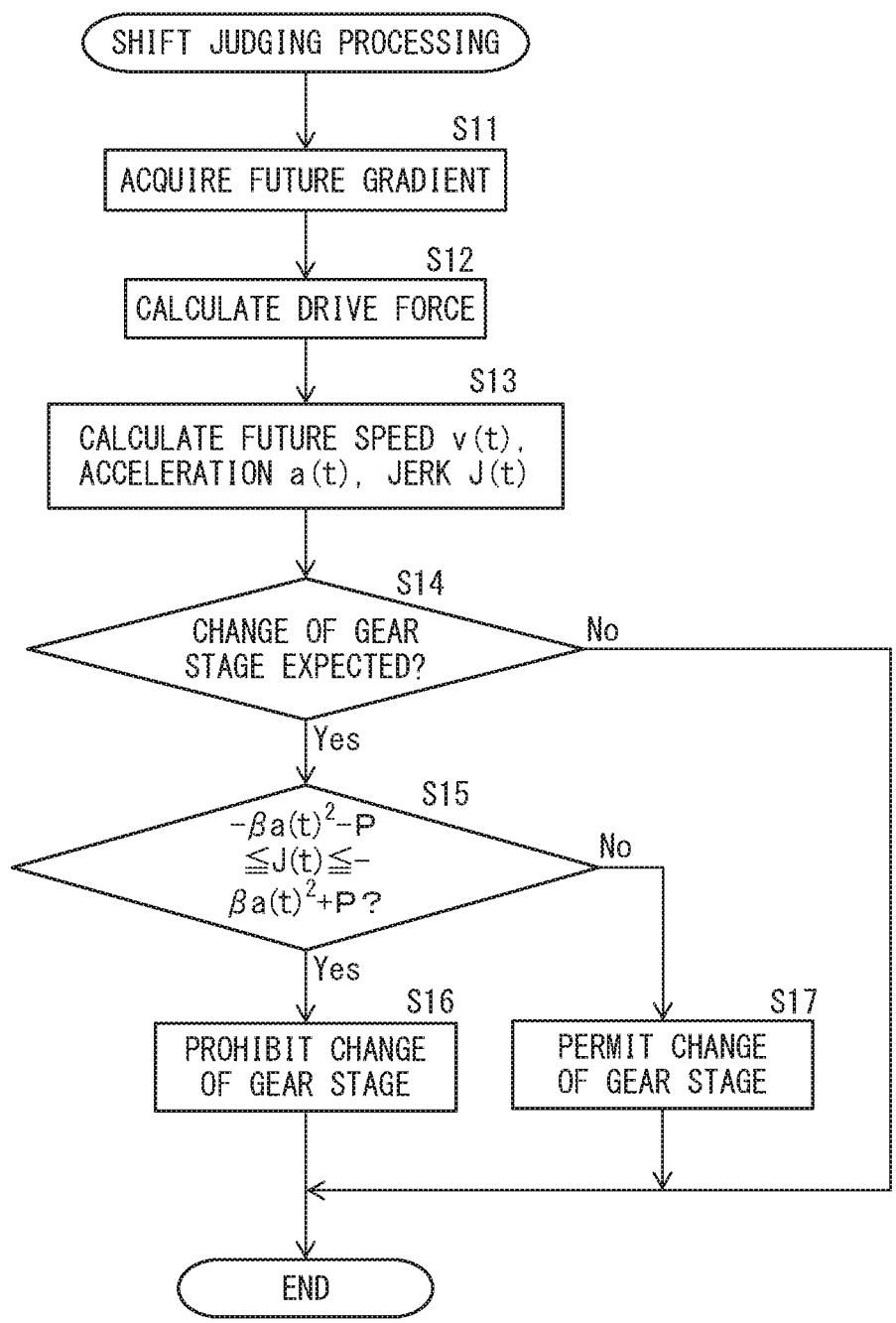
FIG. 7 is a flow chart showing shift judging processing for judging if a gear should be shifted.

FIG. 7 is a flow chart showing shift judging processing for judging if a gear should be shifted. The illustrated control routine is performed every certain time interval.

First, at step S11, the gradient acquiring part 61 acquires the gradient of the road on which the vehicle 1 is scheduled to be driven in the future. Specifically, the gradient acquiring part 61 identifies the road on which the vehicle 1 is scheduled to be driven in the future based on the driving route of the vehicle 1 set in advance and the current position information sent by the GPS receiver 52. In addition, the gradient acquiring part 61 acquires the gradient at the road on which the vehicle is scheduled to be driven in the future, from the map information, etc.

Next, at step S12, the driving force calculating part 62 calculates the maximum driving force of the vehicle 1. The maximum driving force of the vehicle 1 is calculated based on the information of the current gear stage of the automatic transmission 3 (for example, the command values to the automatic transmission 3).

Next, at step S13, the future change estimating part 63 estimates the acceleration v(t) of the vehicle 1 in the future and the future change of the acceleration a(t) and jerk J(t), in the case where the driving force of the vehicle 1 is maintained at the maximum driving force at the current gear stage. Specifically, the acceleration at the different timings "t" is calculated based on the above equation (2), and the speed v(t) at the different timings "t" is calculated based on the calculated acceleration a(t) and the current speed v(t). Further, the jerk J(t) at the different timings "t" is calculated by finding the change along with time of the acceleration calculated in this way.

Next, at step S14, the shift control part 64 judges if the gear is expected to be shifted if the amount of depression of the accelerator pedal is maintained constant as it is, based on the future speed v(t) estimated by the future change estimating part 63 at step S13 and the map shown in FIG. 4. For example, if the future speed "v" estimated by the future change estimating part 63 changes from the speed of S3 to S4 of FIG. 4, it is judged that the gear is expected to be shifted. If at step S14 it is judged that gear is not expected to be shifted, the control routine is ended. On the other hand, if, at step S14, it is judged that the gear is expected to be shifted, the control routine proceeds to step S15.

At step S15, it is judged if the future jerk J(t) estimated by the future change estimating part 63 at step S13 is within the reference range of speed of change shown in the above equation (10). If, at step S15, it is judged that the future jerk J(t) is within the reference range of speed of change, the control routine proceeds to step S16. At step S16, shift at the automatic transmission 3 is prohibited, and the control routine is ended.

On the other hand, if, at step S15, it is judged that the future jerk J(t) will be outside the reference range of speed of change, the control routine proceeds to step S17. At step S17, shift of the automatic transmission 3 is permitted. Therefore, when the speed of the vehicle 1 changes so as to straddle the boundary line between the gear stages of FIG. 4, the gear is shifted at the automatic transmission 3.

Effects

According to the present embodiment, when the occupants are expected to not notice the change in acceleration, shift of the automatic transmission 3 is prohibited. For this reason, even when driving on a road with a changing gradient so that the gear is frequently repeatedly shifted up and shifted down by a stepped automatic transmission, when the occupants are expected to not notice the change in acceleration, shift of the gear is prohibited. As a result, the comfort of the occupants is maintained, while deterioration of the driveability due to the shift of gear being frequently repeated is suppressed.

Modification

Note that, in the above embodiment, the shift control part 64 decides whether to permit a shift of gear, based on whether the occupants would notice the change in acceleration of the vehicle 1. However, the shift control part 64 may also decide whether to permit a shift of gear, based on whether the occupants would notice the change in the speed of the vehicle 1. In this case, the future change estimating part 63 estimates the change of the speed of the vehicle in the future if the maximum driving force is applied, based on the gradient of the road acquired by the gradient acquiring part 61 and the maximum driving force calculated by the driving force calculating part 62. In addition, in this case, the shift control part 64 prohibits change of the gear stage when the speed of change of the speed of the vehicle in the future if the maximum driving force applied, estimated by the future change estimating part 63, is within a reference range of speed of change where the occupants would not notice a change in speed, and permits change of the gear stage when the speed of change of the speed of the vehicle in the future if the maximum driving force applied, estimated by the future change estimating part 63, is outside a reference range of speed of change.

Second Embodiment

Next, referring to FIG. 8, a control device according to a second embodiment will be explained. Below, parts different from the control device according to the first embodiment will be focused on in the explanation.

In this regard, as explained above, when the acceleration changes to become the acceleration shown in the above-mentioned equation (3), the occupants of the vehicle 1 feel the acceleration is constant. On the other hand, if the amount of depression of the accelerator pedal is maintained constant, the driver expects that the vehicle 1 will accelerate (or decelerate) by constant acceleration. Therefore, if the amount of depression of the accelerator pedal is maintained constant, the vehicle 1 preferably accelerates (or decelerates) by the acceleration shown in equation (3).

However, on a road where the gradient continuously changes in small extents, the actual acceleration of the vehicle 1 also changes along with the gradient. As a result, even if the amount of depression of the accelerator pedal is maintained constant, the acceleration of the vehicle 1 changes becoming faster or slower relative to the acceleration shown in equation (3).

Therefore, in the present embodiment, the driving force calculating part 62 is configured so as to calculate the current driving force when the gear stage of the automatic transmission 3 is the current gear stage and the output torque of the internal combustion engine 2 is the current output torque. In addition, the future change estimating part 63 is configured to estimate the change of acceleration of the vehicle 1 in the future when assuming the current driving force continues, based on the gradient of the road acquired by the gradient acquiring part 61 and the current driving force calculated by the driving force calculating part 62. Further, the output torque control part 65 controls the output torque so that when the speed of change of the acceleration of the vehicle 1 in the future when assuming the current driving force estimated by the future change estimating part 63 continues, is outside the minimum range of speed of change narrower than the reference range of speed of change, the speed of change is within the minimum range of speed of change.

Below, the control of the output torque in the output torque control part 65 will be explained in detail. As explained above, if the jerk of the vehicle 1 is in the relationship shown by the above equation (9), the occupants of the vehicle 1 feel the vehicle 1 is accelerating (or decelerating) by constant acceleration. Therefore, if maintaining the jerk of the vehicle 1 near the value calculated by the above equation (9), the occupants of the vehicle 1 feel the vehicle 1 is accelerating (or decelerating) by constant acceleration.

Therefore, in the present embodiment, the output torque control part 65 controls the output torque of the vehicle 1 so that the jerk of the vehicle 1 is maintained within a certain range centered about the jerk J(t) calculated by the above equation (9) (below, referred to as the "minimum range of speed of change"), when the amount of depression of the accelerator pedal is maintained constant. Here, the "minimum range of speed of change" is a range narrower than the reference range of speed of change in the above-mentioned first embodiment.

Specifically, using the future change estimating part 63, the change of the acceleration a' of the vehicle 1 in the future when the current driving force continues, is estimated based on the gradient of the road acquired by the gradient acquiring part 61 and the current driving force calculated by the driving force calculating part 62. The acceleration a' of the vehicle 1 at the timing "t" is, for example, calculated by the following equation (11):

$$a' = [Fdc - F(A \cdot v^2 + B \cdot v + C) - M \cdot g \cdot \sin\theta]/M \quad (11)$$

In equation (11), Fdc indicates the driving force currently output by the vehicle 1, that is, the driving force at the time of the current amount of depression of the accelerator pedal. The current amount of driving calculated by the driving force calculating part 62 is assigned to Fdc.

Further, the future change estimating part 63 of the present embodiment, in the same way as the first embodiment, repeatedly calculates the speed and acceleration of the vehicle 1 a fine time Δt seconds later to thereby estimate the change of the acceleration of the vehicle 1 from the current time to a predetermined time later. In addition, the future change estimating part 63 estimates the change of the jerk J' when assuming the current drive force continues from the calculated change of the acceleration "a".

The output torque control part 65 judges if the jerk of the vehicle 1 at different points of time from the current time to a predetermined time later when assuming that the current driving force estimated by the future change estimating part 63 continues, is within the minimum range of speed of change shown by the following equation (12):

$$-\beta a'(t)^2 - Q \leq J'(t) \leq -\beta \cdot a'(t)^2 + Q \quad (12)$$

In equation (12), Q is a positive constant and is found by experiments. Note that however, Q is a value smaller than the constant P at the above-mentioned equation (10).

Further, the output torque control part 65 maintains the output torque of the internal combustion engine 2 as it is without changing it, if judging the jerk of the vehicle 1 at different points of time from the current time to a predetermined time later is within the minimum range of speed of change shown by the above equation (12). On the other hand, the output torque control part 65 changes the output torque of the internal combustion engine 2, even if the amount of depression of the accelerator pedal is constant, if judging that at least part of the jerk of the vehicle 1 at different points of time from the current time to a predetermined time later is outside the minimum range of speed of change shown by the above equation (12). For example, if the jerk of the vehicle 1 is smaller than the minimum range of speed of change, the output torque control part 65 changes the output torque of the internal combustion engine 2 to become larger. On the other hand, when the jerk of the vehicle 1 is larger than the minimum range of speed of change, the output torque control part 65 changes the output torque of the internal combustion engine 2 to become smaller.

Figure 8:
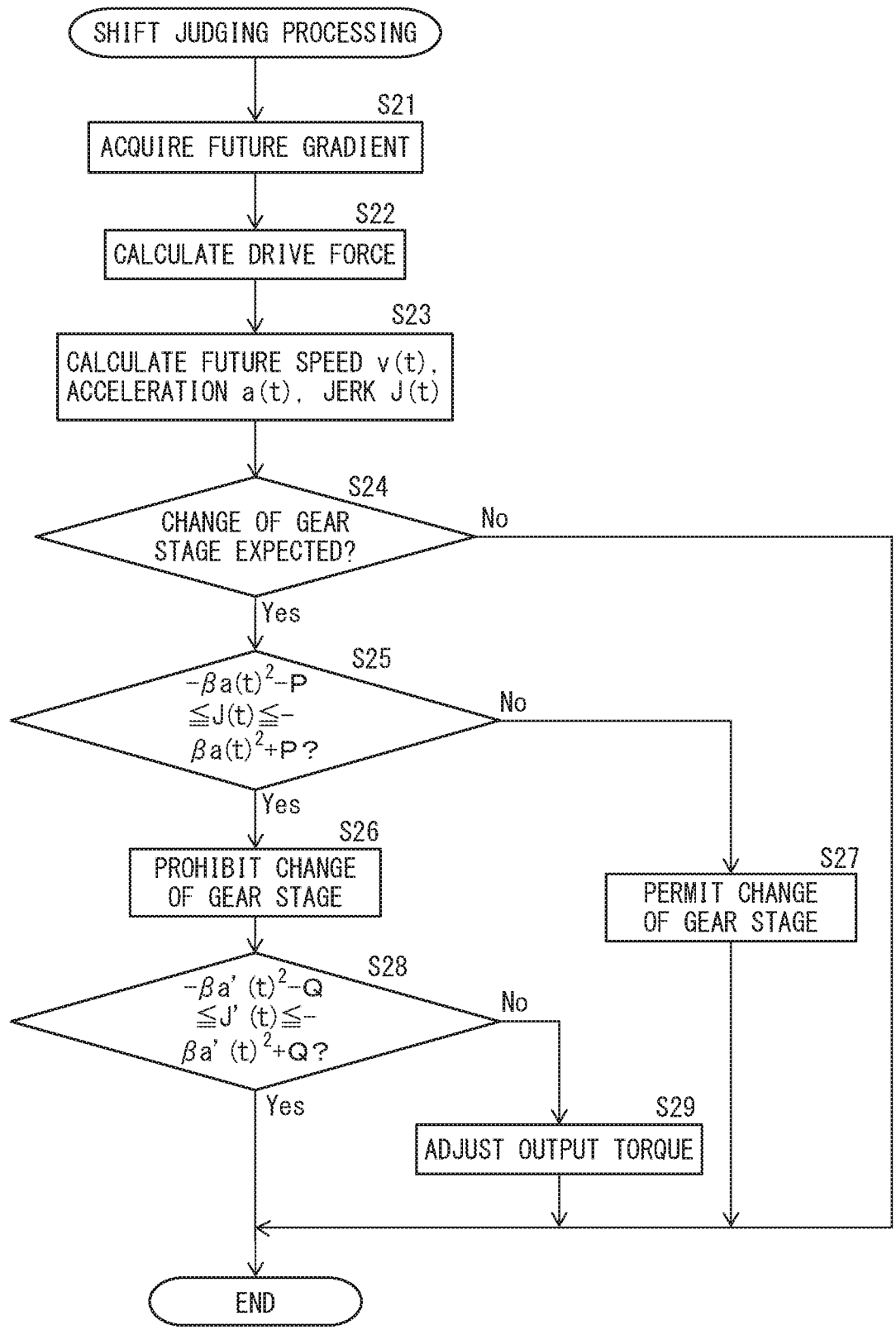
FIG. 8 is a flow chart showing shift judging processing for judging if a gear should be shifted.

FIG. 8 is a flow chart showing shift judging processing for judging if a gear should be shifted. The illustrated control routine is performed every certain time interval. Note that, steps S21 to S27 of FIG. 8 are similar to steps S11 to S17 of FIG. 7, therefore explanations will be omitted.

If, at step S25, it is judged that a future jerk J(t) is in the reference range of speed of change, the control routine proceeds to step S26 where the shift at the automatic transmission 3 is prohibited. Next, step S28, it is judged if the future jerk J'(t) when assuming that the current driving force continues, is within the minimum range of speed of change shown in the above equation (12). If at step S28 it is judged that the future jerk J'(t) is within the minimum range of speed of change, the control routine is ended without the output torque being adjusted. On the other hand, if, at step S28, it is judged that the future jerk J'(t) is outside the minimum range of speed of change, the routine proceeds to step S29. At step S29, even if the amount of depression of the accelerator pedal is constant, the output torque of the internal combustion engine 2 is adjusted.

According to the second embodiment, so long as the amount of depression of the accelerator pedal is constant, the change of acceleration of the vehicle 1 is maintained near a range at which occupants feel the acceleration is constant. Therefore, the occupants are kept from feeling frequent acceleration and deceleration, and the comfort of the occupants is improved.

Modification

Note that, in the above second embodiment, the output torque control part 65 controls the output torque so that the occupants feel that the acceleration of the vehicle 1 is constant. However, the output torque control part 65 may also control the output torque so that the occupants feel the speed of the vehicle 1 is constant. In this case, the future change estimating part 63 is configured to also estimate the change of speed of the vehicle 1 in the future when assuming the current driving force continues, based on the gradient of the road acquired by the gradient acquiring part 61 and the current driving force calculated by the driving force calculating part 62. In addition, in this case, the output torque control part 65 controls the output torque so that when the speed of change of the speed of the vehicle in the future when assuming the current driving force estimated by the future change estimating part 63 continues, is outside a minimum range of speed of change narrower than the reference range of speed of change, the speed of change is within the minimum range of speed of change.

REFERENCE SIGNS LIST 1. vehicle
2. internal combustion engine
3. automatic transmission
10. control device
11. electronic control unit (ECU)
41. accelerator sensor
42. vehicle speed sensor
43. torque sensor
44. weight sensor
51. vehicle external communication device
52. GPS receiver

The invention claimed is:

1. A control device of a vehicle provided with a stepped automatic transmission, configured to:
   acquire a gradient of a road on which the vehicle is scheduled to drive in the future;
   calculate a maximum driving force when a gear stage of the automatic transmission is a current gear stage;
   estimate a change of speed or acceleration of the vehicle in the future if the maximum driving force is applied, based on the acquired gradient of the road and the calculated maximum driving force;
   control a gear stage of the automatic transmission; and
   control an output torque of an internal combustion engine,
   wherein:
   the control device is configured to prohibit change of the gear stage when the estimated speed of change of the speed or acceleration of the vehicle in the future if the maximum driving force applied, is within a reference range of speed of change where the occupants would not notice a change in speed or acceleration, and permit change of the gear stage when the estimated speed of change of the speed or acceleration of the vehicle in the future if the maximum driving force applied, is outside the reference range of speed of change; and
   the control device is configured to:
      calculate a current driving force when the gear stage of the automatic transmission is the current gear stage and the output torque of the internal combustion engine is the current output torque;
      estimate a change of speed or acceleration of the vehicle in the future when it is assumed the current driving force continues, based on the acquired gradient of the road and the calculated current driving force; and
      control the output torque so that when the estimated speed of change of the speed or acceleration of the vehicle in the future when assuming the current driving force continues, is outside a minimum range of speed of change narrower than the reference range of speed of change, the speed of change is within the minimum range of speed of change.

2. The control device of a vehicle according to claim 1, comprising:
   a communication device able to communicate with a vehicle other than the vehicle,
   wherein the control device is configured to acquire the gradient of the road on which the vehicle is scheduled to be driven in the future from another vehicle driving in front of the vehicle through the communication device.

* * * * *